United States Patent
Bickel et al.

(10) Patent No.: US 9,202,310 B2
(45) Date of Patent: *Dec. 1, 2015

(54) PHYSICAL REPRODUCTION OF REFLECTANCE FIELDS

(75) Inventors: Bernd Bickel, Zurich (CH); Marc Alexa, Berlin (DE); Jan Kautz, London (GB); Wojciech Matusik, Lexington, MA (US); Fabrizio Pece, London (GB)

(73) Assignee: Disney Enterprises, Inc., Burbank, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 13/608,819

(22) Filed: Sep. 10, 2012

(65) Prior Publication Data

US 2013/0016100 A1 Jan. 17, 2013

Related U.S. Application Data

(63) Continuation-in-part of application No. 13/086,303, filed on Apr. 13, 2011, now Pat. No. 8,952,959.

(60) Provisional application No. 61/323,812, filed on Apr. 13, 2010.

(51) Int. Cl.
*G06T 17/00* (2006.01)

(52) U.S. Cl.
CPC ..................................... *G06T 17/00* (2013.01)

(58) Field of Classification Search
USPC .......................................... 345/419, 420, 426
See application file for complete search history.

(56) References Cited

U.S. PATENT DOCUMENTS

| | | | |
|---|---|---|---|
| 6,424,351 B1 * | 7/2002 | Bishop et al. ................. | 345/582 |
| 6,697,518 B2 | 2/2004 | Belhumeur et al. .......... | 382/154 |
| 6,714,195 B1 | 3/2004 | Ezra et al. .................... | 345/423 |
| 6,862,024 B2 | 3/2005 | Perry et al. ................... | 345/420 |
| 7,154,504 B2 | 12/2006 | Abdo ............................ | 345/581 |
| 7,547,648 B2 | 6/2009 | Ruess et al. .................. | 438/975 |
| 7,633,503 B2 * | 12/2009 | Snyder et al. ................ | 345/426 |
| 8,026,929 B2 | 9/2011 | Naimark ...................... | 345/629 |

(Continued)

OTHER PUBLICATIONS

Vogiatzis, George, "Visual Estimation of Shape, Reflectance and Illumination", A thesis submitted for the degree of *Doctor of Philosophy* at Trinity College, University of Cambridge, 2006, 147 pages.

(Continued)

*Primary Examiner* — Kimbinh T Nguyen
(74) *Attorney, Agent, or Firm* — Sheppard, Mullin, Richter & Hampton, LLP

(57) ABSTRACT

A three-dimensional relief can be produced from one or more two-dimensional digital (2D) images. A height field is computed from the 2D images and illumination direction information. The height field comprises a multiplicity of geometric surface elements arrayed in a 2D field corresponding to the pixels of the one or more 2D images. Each geometric surface element corresponds to a pixel of each of the digital images and has at least one height parameter representing a displacement from a surface floor. Once the height field is computed, optimizations can be made to the height field including adding and adjusting albedo and glossy surface finishing. The height field can be used to fabricate relief elements in a material, such that each relief element corresponds in shape, position in the height field, and height above the surface floor, to one of the geometric surface elements in the height field.

56 Claims, 8 Drawing Sheets

(56) References Cited

U.S. PATENT DOCUMENTS

| | | | |
|---|---|---|---|
| 8,264,504 B2 | 9/2012 | Naimark | 345/629 |
| 2003/0085280 A1 | 5/2003 | Tsikos et al. | 235/454 |
| 2006/0061566 A1 | 3/2006 | Verma et al. | 345/419 |
| 2007/0035815 A1* | 2/2007 | Edgar et al. | 359/359 |
| 2010/0085359 A1* | 4/2010 | Wu et al. | 345/426 |
| 2011/0004448 A1 | 1/2011 | Hurley et al. | 703/1 |
| 2011/0248996 A1 | 10/2011 | Alexa et al. | 345/420 |
| 2011/0311107 A1* | 12/2011 | Levesque | 382/106 |
| 2012/0299918 A1 | 11/2012 | Abeloe | 345/420 |
| 2013/0060540 A1 | 3/2013 | Frahm et al. | 703/2 |
| 2013/0155195 A1 | 6/2013 | Zalevsky et al. | 348/46 |

OTHER PUBLICATIONS

Marc Alexa, et al., "Reliefs as Images," ACM Transactions on Graphics (TOG)—Proceedings of ACM SIGGRAPH 2010, vol. 29, Issue 4, Jul. 2010.

* cited by examiner

PHYSICAL REPRODUCTION OF REFLECTANCE FIELDS

CROSS-REFERENCE TO RELATED APPLICATIONS

This is a continuation-in-part of U.S. patent application Ser. No. 13/086,303, filed Apr. 13, 2011, entitled "EMBEDDING IMAGES INTO A SURFACE USING OCCLUSION," the benefit of the filing date of which is hereby claimed and the specification of which is incorporated herein in its entirety by this reference. The benefit of the filing date of U.S. Provisional Patent Application No. 61/323,812, filed Apr. 13, 2010, entitled "EMBEDDING IMAGES INTO A SURFACE USING OCCLUSION," is also hereby claimed, and the specification thereof incorporated herein in its entirety by this reference.

BACKGROUND

A relief is a three-dimensional (3D) sculpture or sculpted surface having a relatively shallow depth with respect to a background plane. For centuries, sculptors have created reliefs by imagining a compressed-depth image of a 3D object and sculpting the image features into the surface of a material, such as a rectangular block of stone, at their compressed depths. An example of a relief having an extremely shallow depth (sometimes referred to as a bas-relief) is the sculpted bust of a person or other subject on the face of a coin. In the example of a coin, the relief conveys to the observer an image of the person or other subject. The manner in which light falls upon a relief contributes to the 3D effect. In the example of a coin, illumination is typically very even, i.e., non-directional, across the relief. As a result of this type of uniform illumination and the shallow depth of the relief, the image that the relief conveys appears very uniform to an observer over a wide range of viewing angles. In an example in which the subject of the relief is a person's face, the face appears essentially the same to the observer regardless of the viewing direction. Most reliefs are intended by the sculptor to be viewed essentially head-on, i.e., from a direction along a normal to the background plane. A deep or unevenly illuminated relief will not appear quite the same when viewed from different directions. Though a sculptor may not think in such terms, the sculptor has in mind a certain fixed association between light reflected from the relief surface and the surface normal.

Computer-assisted techniques for producing reliefs from 3D digital models have been described. The techniques address the above-referenced depth compression and other issues. The output of such techniques is a digital model of the relief. Such a digital model could then be used to drive an automated fabrication machine that sculpts the relief from a block of material or to produce a mold for manufacturing the relief through a molding process.

SUMMARY

Embodiments of the present invention relate to a system and method for producing a three-dimensional relief from one or more two-dimensional digital (2D) images. In an exemplary embodiment, a height field is computed from the one or more 2D images and illumination direction information. The height field comprises a multiplicity of geometric surface elements arrayed in a 2D field corresponding to the pixels of the one or more 2D images. Each geometric surface element corresponds to a pixel of each of the digital images and has at least one height parameter representing a displacement from a surface floor. Once the height field is computed, optimizations or adjustments can optionally be made to the height field. The height field can be used to fabricate relief elements in a material, such that each relief element corresponds in shape, position in the height field, and height above the surface floor, to one of the geometric surface elements in the height field. In addition, this height field can contain an albedo and reflectance properties of varying glossiness.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
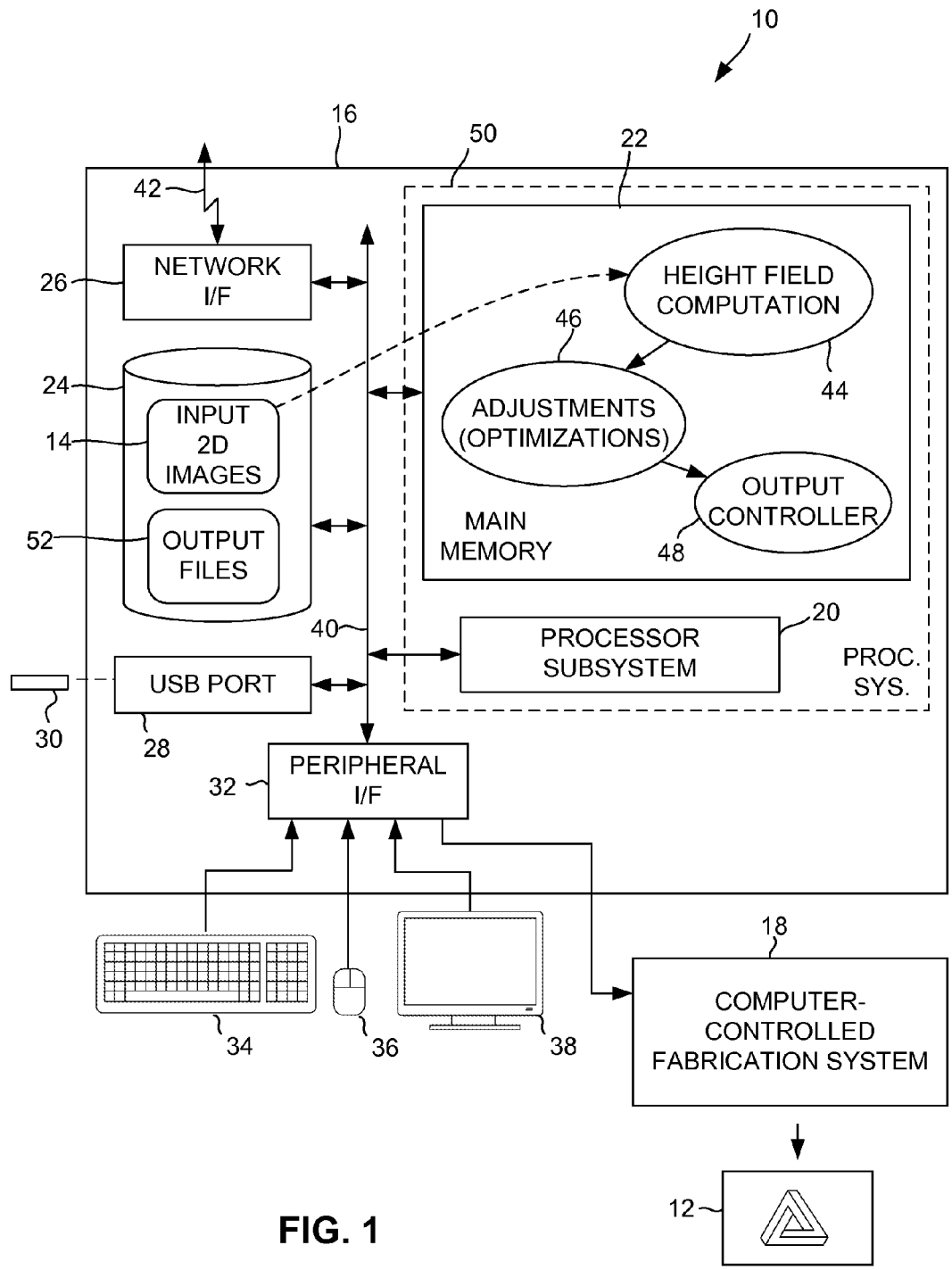
FIG. 1 is a block diagram of a computer system that is programmed and configured to effect a method for producing a relief, in accordance with an exemplary embodiment of the invention.

As illustrated in FIG. 1, in an illustrative or exemplary embodiment of the invention, a system 10 for producing a three-dimensional (3D) relief 12 from one or more two-dimensional digital (2D) digital images 14 includes a computer system 16 that controls a fabrication system 18. In the exemplary embodiment, computer system 16 essentially can be a personal computer system that has been suitably programmed or otherwise configured, as described below. But for the software elements described below, computer system 16 can have a conventional structure and configuration. Accordingly, computer system 16 includes hardware and software elements of the types commonly included in such computer systems, such as a processor subsystem 20, a memory subsystem 22, non-volatile data storage 24 (e.g., a hard disk drive, FLASH memory, etc.), a network interface 26, and one or more ports 28 for reading from and writing to external devices. Such external devices can include a removable data storage medium 30, such as a Universal Serial Bus (USB) "thumb drive." Computer system 16 also includes a peripheral interface 32 through which data communication with a keyboard 34, mouse 36, display 38 and the above-referenced printer 18 occur. Peripheral interface 32 can comprise USB ports of the same type as port 28 or any other suitable type of ports. In other embodiments, computer system 16 can include hardware and software elements in addition to those described herein or that are different from those described herein. The above-described elements can communicate with one another via a digital bus 40. Computer system 16 can communicate with remote devices (not shown) via a network connection 42, such as a connection to the Internet.

Memory subsystem 22 is generally of a type in which software elements, such as data and programming code, are operated upon by processor subsystem 20. In accordance with conventional computing principles, processor subsystem 20 operates in accordance with programming code, such as operating system code and application program code. In the exemplary embodiment of the invention, such application program code can include the following software elements: a height field computation element 44, a height field adjustment (or optimization) element 46, and an output controller element 48. Although these software elements are conceptually shown for purposes of illustration as stored or residing in memory subsystem 22, persons skilled in the art to which the invention relates can appreciate that such software elements may not reside simultaneously or in their entireties in memory subsystem 22 but rather may be retrieved in portions on an as-needed basis, e.g., in code segments, files, modules, objects, data structures, instruction-by-instruction, or any other suitable basis, from data storage 24 or other suitable source (e.g., via network connection 42). Note that although only height field computation element 44, height field adjustment element 46, and output controller element 48 are shown for purposes of clarity, other software elements of the types conventionally included in computers systems that enable them to operate properly are generally included, such as operating system software.

It should be noted that, as programmed or otherwise configured in accordance with the above-described software elements, the combination of processor subsystem 20, memory subsystem 22 (or other element or elements in which software is stored or resides) and any related elements generally defines a programmed processor system 50. It should also be noted that the combination of software elements and the medium on which they are stored or in which they reside (e.g., memory subsystem 22, data storage 24, removable data storage medium 30, etc.) generally constitutes what is referred to in the patent lexicon as a "computer program product."

The above-referenced one or more 2D digital images 14 can be stored in data storage 24 or other suitable data storage medium in the form of one or more files and used as input to the computer-implemented method in the manner described below. Likewise, output files 52 (e.g., representing information that can be used to drive the computer-controlled fabrication system 18) can be stored in data storage 24 or other suitable data storage medium. In some embodiments the process or method of producing a producing a 3D relief from one or more 2D images 14 can give rise to one or more intermediate or temporary data files or data structures (not shown), which can be stored in data storage 24, memory subsystem 22, or other suitable location. As persons skilled in the art to which the invention relates can appreciate, any of the above-described software elements, including data files, can be stored in any suitable format in any suitable location or combination of locations, in whole or part, and are only conceptually shown in FIG. 1 for purposes of illustration.

Figure 2:
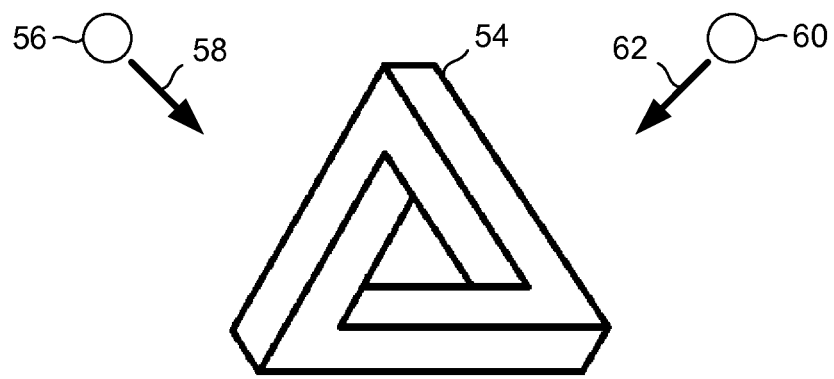
FIG. 2 illustrates a subject illuminated by two light sources.

Preliminary to the computer-implemented method described below, at least one 2D digital image 14 is captured or otherwise provided to computer system 16. As illustrated in FIG. 2, one such 2D digital image 14 (FIG. 1) can represent a subject 54 illuminated by a first light source 56, illuminating subject 54 from a first direction 58. Another such digital 2D image 14 can represent the same subject 54 illuminated by a second light source 60 from a second direction 62. Although the exemplary subject 54 shown in FIG. 2 represents an abstract 3D design, embodiments of the invention can use any scene as the subject, involving any suitable type of animate or inanimate subjects. As just one example, a face or head may provide an interesting subject for reasons described below. Indeed, anything that has conventionally been used as subject matter for a relief or that would occur to persons to use as subject matter for a relief can be the subject of 2D digital image 14.

Note in FIG. 2 that the exemplary subject 54 does not represent a real object but rather a physically impossible shape. As such, subject 54 illustrates that the subject of 2D digital image 14 (FIG. 1) need only be something that can be represented in the digital realm in a manner that includes illumination information. For a physically impossible shape such as subject 54, the illumination must be applied in the digital realm. This can be done by image processing techniques that are well understood in the art. In the case of a subject that is a real object, a 2D digital image of the subject, illuminated by two or more light sources, can be captured by conventional photographic means (not shown). For purposes of clarity, subject 54 is shown in FIG. 2 in line drawing form without any shading that would represent illumination by light sources 56 and 58.

Figure 3:
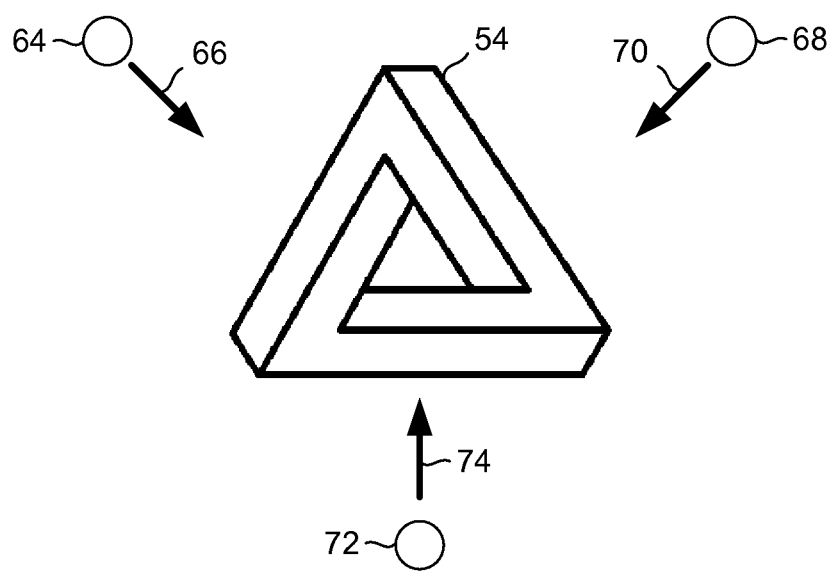
FIG. 3 illustrates a subject illuminated by three light sources.

As illustrated in FIG. 3, in other embodiments, a first 2D digital image 14 (FIG. 1) can be provided of subject 54 as illuminated by a first light source 64 from a first direction 66; a second 2D digital image 14 can be provided of subject 54 as illuminated by a second light source 68 from a second direction 70; and a third 2D digital image 14 can be provided of subject 54 as illuminated by a third light source 72 from a third direction 74.

Figure 4:
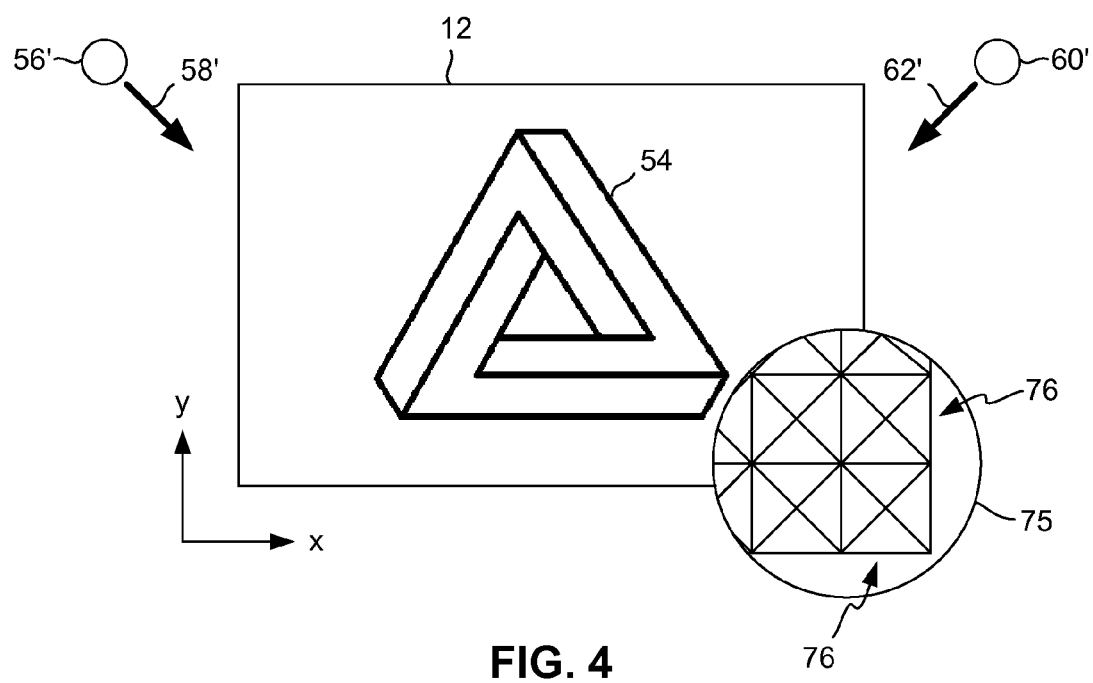
FIG. 4 is a top plan view of an exemplary relief produced by the method of FIG. 6.

As illustrated in FIG. 4, the method described below can use the two above-described 2D digital images 14 (FIG. 1) to produce a relief 12 that, when illuminated by a first light source 56' from the first direction 58', conveys to an observer an image of subject 54 as illuminated from the first direction 58' and, when illuminated by a second light source 60' from the second direction 62', conveys to an observer an image of subject 54 as illuminated from the second direction 62'.

Although FIGS. 2 and 3 illustrate instances in which all of the 2D digital images 14 are of the same subject, in other instances the 2D digital images 14 can be of different subjects. For example, a first 2D digital image 14 can be of a person's face while the person is smiling and illuminated from a first direction, and a second 2D digital image 14 can be of the same person's face while the person is frowning and illuminated from a second direction. Although drawing figures relating to such an example are not included for purposes of clarity, the method described below can use such images to produce a relief that, when illuminated from the first direction, can convey to the observer an image of the smiling face and, when illuminated from the second direction, can convey to the observer an image of the frowning face.

Figure 5:
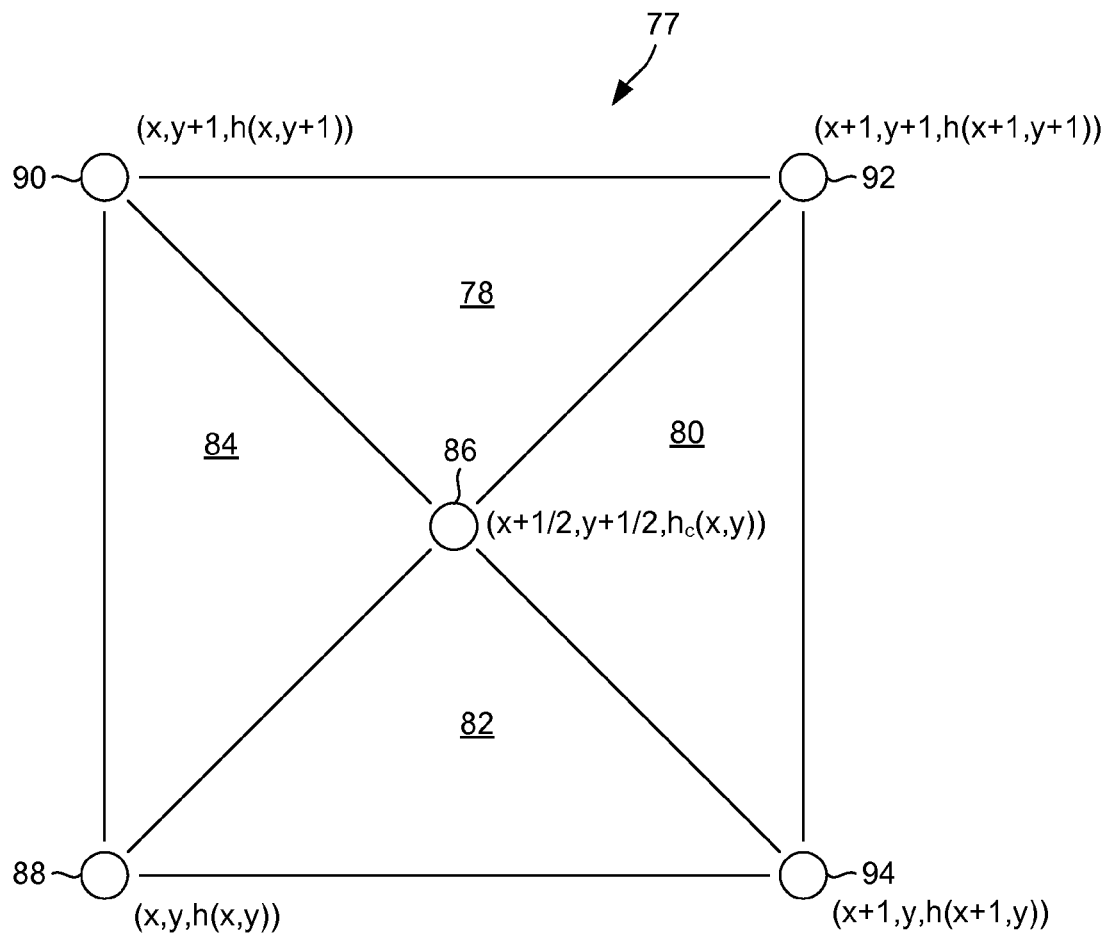
FIG. 5 illustrates a representation of pyramidal surface element, in accordance with an exemplary embodiment of the invention.

As shown in the enlarged area 75 of FIG. 4, relief 12 comprises an array of pyramidal relief elements 76 arrayed in an x-y plane. There are a sufficiently large number (i.e., a multiplicity) of such pyramidal relief elements 76 that a person observing relief 12 from a distance does not perceive them individually but rather perceives only their collective visual effect. As shown in FIG. 5 and further described below with regard to the exemplary methods, each pyramidal relief element 76 of relief 12 (FIG. 4) is fabricated to correspond to a pyramidal surface element 77 in the digital model realm. Each pyramidal surface element 77 comprises four triangular facets 78, 80, 82 and 84 that adjoin each other at five vertices 86, 88, 90, 92 and 94. Vertex 86 is at the center of the pyramid, where triangular facets 78, 80, 82 and 84 adjoin each other. Vertex 86 is surrounded by vertices 88, 90, 92 and 94 at the corners of the pyramid. The array of pyramidal surface elements 77 defines what is commonly referred to in the art to which the invention relates as a height field. Furthermore, every pyramidal surface element comprises a surface albedo and surface glossiness. As described below, the method involves computing a height of each of vertices 86, 88, 90, 92 and 94 above a reference plane (commonly referred to in the art as a floor of the surface to which the height field relates). Vertices 86, 88, 90, 92 and 94 can be assigned parameters that include an x-y position in the height field and a height above the floor. In the exemplary embodiment, each pyramidal surface element 77 has the following parameters: vertex 88 has an x position parameter x, a y position parameter y, and a height parameter h(x,y); vertex 90 has an x position parameter x, a y position parameter y+1, and a height parameter h(x,y+1); vertex 92 has an x position parameter x+1, a y position parameter y+1, and a height parameter h(x+1,y+1); vertex 94 has an x position parameter x+1, a y position parameter y, and height parameter h(x+1,y); and the center vertex 86 has an x position parameter x+½, a y position parameter y+½, and height parameter $h_c(x,y)$. Although in the exemplary embodiment each surface element 76 has a pyramidal shape, in other embodiments the surface elements may have other suitable geometric shapes.

In the exemplary embodiment, a computer-implemented method of producing a 3D relief 12 from at least one 2D digital image 14 can be initiated by a person (user) who operates computer system 16. A user can operate computer system 16 locally using keyboard 34, mouse 36, display 38, etc., or remotely via network connection 42. In operation, and in accordance with the effects of software elements that can include height field computation element 44, a height field adjustment element 46, and output controller element 48, computer system 16 can provide a suitable user interface through which the user can interact with computer system 16. Although such a user interface is not described herein in further detail, it should be noted that a user can control computer system 16 in a manner that allows the user to selectively apply the adjustments or optimizations described below that are associated with height field adjustment element 46. Thus, in some instances a user can select any number (zero or more) of the adjustments, in any combination with each other or with other image processing, depending on whether in the user's judgment the adjustment will improve the appearance of relief 12.

Figure 6:
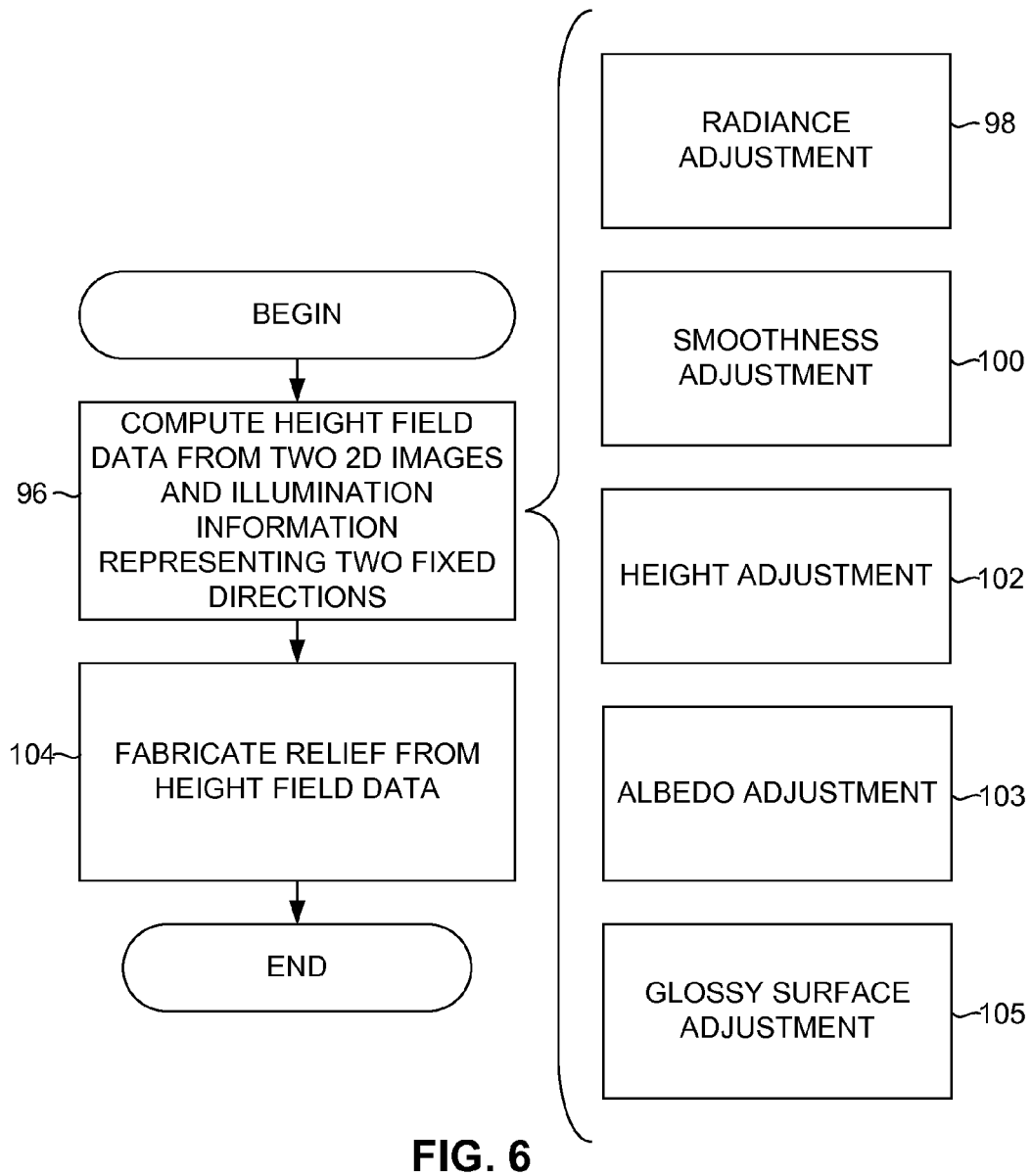
FIG. 6 is a flow diagram illustrating a method for producing a relief using the system of FIG. 1, in accordance with an exemplary embodiment of the invention.

An exemplary method of producing a 3D relief 12 from at least one 2D digital image 14 is illustrated by the flow diagram of FIG. 6. In operation, computer system 16, in accordance with height field computation element 44, computes the height field using two 2D digital images 14, as indicated by block 96.

In the surface model described below that is used to represent relief 12 in the digital realm, each pixel of each of the two 2D digital images 14 is associated with not just one but with several pyramidal surface elements 77. Together, pyramidal surface elements 77 provide enough degrees of freedom that the different resulting radiance values are integrated by the observer's perception at a realistic viewing distance. For an embodiment in which two such 2D digital images 14 form the input data to the method, the method creates two different radiance values for each pyramidal surface element 77 when the pyramidal surface element 77 is illuminated by light sources from two correspondingly different directions.

Stated another way, the four triangular facets 78-84 (FIG. 4) have different normals (not shown) and thus different foreshortening. When viewed from a distance, a human observer will perceive the aggregate radiance of the four triangular facets 78-84. That is, the model provides a discrete relief surface that reproduces each pixel's intensity as the integrated radiance of the four triangular facets 78-84 of the pyramidal surface element 77 corresponding to the pixel. The model can be described as follows.

The model involves several simplifications or assumptions that may not hold true under all conditions. For example, it can be assumed for purposes of the model that two light source directions $l^0$, $l^1$ are fixed, and two discrete images are given $I^0$, $I^1$ are elements of the set $\mathbb{R}^{m \times n \times c}$. It can further be assumed that the observer is at a sufficient distance relative to the size of the relief (i.e., in a direction v=(0,0,1) that the pyramidal surface elements 77 are not individually apparent to the observer.

The radiance per pixel can be derived as follows. The vertices of the pyramidal surface element 77 corresponding to each pixel of each of the 2D digital images 14 can be denoted as $$p(x,y) = (x, y, h(x,y))$$　Eqn. (1)

The center vertex 86 ($p_c$) surrounded (counterclockwise) by the corner vertices 88-94 (FIG. 5) p(x,y), p(x+1,y), p(x+1,y+1), p(x,y+1) can be denoted as $$p_c(x, y) = \left(x + \frac{1}{2}, y + \frac{1}{2}, h_c(x, y)\right).$$ Eqn. (2)

The radiance of a pyramidal surface element 77 is computed as viewed from the v=(0,0,1) direction. Note that the projected area of all four triangular facets 78-84 is ¼. The cross products of edges can be denoted as incident on the center vertex 86 as $$\tilde{n}_0(x,y) = (p_c(x,y) - p(x,y)) \times (p_c(x,y) - p(x+1,y))$$

$$\tilde{n}_1(x,y) = (p_c(x,y) - p(x+1,y)) \times (p_c(x,y) - p(x+1,y+1))$$

$$\tilde{n}_2(x,y) = (p_c(x,y) - p(x+1,y+1)) \times (p_c(x,y) - p(x,y+1))$$

$$\tilde{n}_3(x,y) = (p_c(x,y) - p(x,y+1)) \times (p_c(x,y) - p(x,y))$$　Eqn. (3)

and then their lengths denoted as $$n_i(x,y) = \|\tilde{n}_i(x,y)\|, \text{ where } i \text{ is a member of the set } \{1,2,3,4\}.$$ Eqn. (4)

The reflected radiance L(x,y) of the pyramidal surface element 77 as illuminated by one of light sources (l) 56 and 58 (FIG. 2) is $$L(x, y) = \sum_{i=1}^{4} \frac{1}{4} \cdot \frac{\tilde{n}_i(x, y)^t}{n_i(x, y)} l = \frac{1}{4}\left(\sum_{i=1}^{4} \frac{1}{4} \cdot \frac{\tilde{n}_i(x, y)^t}{n_i(x, y)}\right) l$$ Eqn. (5)

When taking the albedo of the surface reflectance into account, the reflected radiance L(x,y) for the pyramidal surface element (x,y) with a surface reflectance ρ(x,y) illuminated by one a light source with direction I is:

$$L(x, y) = \left(\sum_{i=1}^{4} \frac{1}{4} \cdot \frac{\tilde{n}_i(x, y)^t}{n_i(x, y)} l\right) \cdot \rho(x, y) = \frac{1}{4}\left(\left(\sum_{i=1}^{4} \frac{1}{4} \cdot \frac{\tilde{n}_i(x, y)}{n_i(x, y)}\right) l\right) \cdot \rho(x, y)^i$$

As it is important to the optimization or adjustment methods described below that $\tilde{n}_i$ is a linear function of the heights $\{h_i\}$, $h_c$, the non-linear part of the radiance function can be included in the lengths $n_i$. For ease of re-implementation, the linear equations for the radiance in terms of the variables $\{h_i\}$ and $h_c$ relative to a light direction $I=(l_x, l_y, l_z)$ can be written as:

$$\begin{pmatrix} \frac{1}{2}(l_x + l_y)\left(\frac{1}{n_1} + \frac{1}{n_4}\right) \\ \frac{1}{2}(-l_x + l_y)\left(\frac{1}{n_1} + \frac{1}{n_2}\right) \\ \frac{1}{2}(-l_x - l_y)\left(\frac{1}{n_2} + \frac{1}{n_3}\right) \\ \frac{1}{2}(l_x - l_y)\left(\frac{1}{n_3} + \frac{1}{n_4}\right) \\ l_x\left(\frac{1}{n_2} - \frac{1}{n_4}\right) + l_y\left(\frac{1}{n_1} - \frac{1}{n_3}\right) \end{pmatrix}^t \begin{pmatrix} h(x, y) \\ h(x+1, y) \\ h(x+1, y+1) \\ h(x, y+1) \\ h_c(x, y) \end{pmatrix} + l_z \sum_{n_1}^{4} \frac{1}{n_i} = 4L(x, y)$$

Eqn. (6)

Equation (6) can be solved for the heights of the vertices of each pyramidal surface element above the reference plane. The results can be stored in a digital output file 52 (FIG. 1) or other location.

When taking into account the albedo of the surface, it is important to the optimization or adjustment methods described below that $\tilde{n}_i$ is a linear function of the surface albedo ρ(x,y) and the heights $\{h_i\}$, $h_c$, the non-linear part of the radiance function can be included in the lengths $n_i$. For ease of re-implementation, the linear equations for the radiance in terms of the variables $\{h_i\}$ and $h_c$ relative to a light direction $I=(l_x, l_y, l_z)$ can be written as:

$$\begin{pmatrix} \frac{1}{2}(l_x + l_y)\left(\frac{1}{n_1} + \frac{1}{n_4}\right) \\ \frac{1}{2}(-l_x + l_y)\left(\frac{1}{n_1} + \frac{1}{n_2}\right) \\ \frac{1}{2}(-l_x - l_y)\left(\frac{1}{n_2} + \frac{1}{n_3}\right) \\ \frac{1}{2}(l_x - l_y)\left(\frac{1}{n_3} + \frac{1}{n_4}\right) \\ l_x\left(\frac{1}{n_2} - \frac{1}{n_4}\right) + l_y\left(\frac{1}{n_1} - \frac{1}{n_3}\right) \end{pmatrix}^t \begin{pmatrix} h(x, y) \\ h(x+1, y) \\ h(x+1, y+1) \\ h(x, y+1) \\ h_c(x, y) \end{pmatrix} \cdot \rho(x, y) + l_z \sum_{n_1}^{4} \frac{1}{n_i} = 4L(x, y)$$

As indicated by blocks 98, 100, 102, 103 and 105 in FIG. 6, any of several adjustments or optimizations can optionally be made to the relief surface (i.e., the data of output file 52) as part of computing the height field (block 96). Such adjustments can be made to the height field by computer system 16 operating in accordance with height field adjustment element 46 (FIG. 1). Such adjustments can include: radiance, smoothness, height, albedo and surface glossiness. Although such adjustments can be made independently from each other in other embodiments of the invention, in the exemplary embodiment the adjustments indicated by blocks 98-102 are made in combination with each other using a weighted methodology in accordance with the following:

$$E = E_g^0 + E_g^1 + w_c E_p + w_p E_p + w_h E_h + w_r E_r \qquad \text{Eqn. (7)}$$

where the E terms represent energies, and the w terms represent the weights.

As indicated by block 98 in FIG. 6, the image difference terms $E_g$ in equation (7) above can be minimized by computing the squared differences between radiance gradients and the corresponding input image gradients. The weights w in equation (7) depend on the light source direction, the gradient direction and the position. The global energy for fitting the gradients of the input images can be expressed as:

$$E_g^b = \sum_{x=1}^{m-1} \sum_{y=1}^{n} E_x^b(x, y) + \sum_{x=1}^{m} \sum_{y=1}^{n-1} E_y^b(x, y) \qquad \text{Eqn. (8)}$$

The squared differences between radiance gradients and the corresponding (compressed) input image gradients can thus be expressed as:

$$E_x^b(x,y) = w_x^b(x,y)(L_x^b(x,y) - D_x^b(x,y))^2$$

$$E_y^b(x,y) = w_y^b(x,y)(L_y^b(x,y) - D_y^b(x,y))^2 \qquad \text{Eqn. (9)}$$

The compressed image gradients D can be expressed as:

$$D_x^b(x,y) = C(I^b(x+1),y) - I^b(x,y))$$

$$D_y^b(x,y) = C(I^b(x),i\, y+1) - I^b(x,y)) \qquad \text{Eqn. (10)}$$

where C is a function that compresses the value of its argument:

$$C(a) = \text{sgn}(a) \cdot \frac{1}{a_d} \log(1 + \alpha_d |a|) \qquad \text{Eqn. (11)}$$

As indicated by block 100 in FIG. 6, the surface smoothness term $E_c$ in equation (7) relates to a desire to minimize the height, i.e., maximize the flatness, of each pyramidal surface element. The surface smoothness terms above can be minimized by computing the second order differences within a pixel of the input image. For center vertices, the smoothness term can be expressed using a sum of their squared Laplacians:

Eqn. (12)

$$E_c = \sum_{x=1}^{m} \sum_{y=1}^{n} (h(x, y) + h(x+1, y) + h(x+1, y+1) + h(x, y+1) - 4h_c(x, y))^2$$

Intuitively, minimizing the surface smoothness term pulls each center vertex 86 towards the mean height of the corresponding center vertex 86 of neighboring pyramidal surface elements 77. However, moving the center vertex 86 to the mean height may not be enough to keep the geometry of a pixel planar. Thus, it may also be useful to consider second order smoothness of corner vertices 88-94 of each pyramidal surface element 77. The second order smoothness term, $E_p$, which appears in equation (7) above, can be expressed as:

$$E_p = \sum_{x=1}^{m} \sum_{y=1}^{n} (h(x, y) + h(x+1, y) + h(x+1, y+1) - h(x, y+1))^2 \quad \text{Eqn. (13)}$$

As indicated by block 102 in FIG. 6, the height difference term $E_h$ in equation (7) relates to a desire to damp large height values. The height difference term promotes the resulting heights being close to a set of desired heights h*(x,y). The height difference term can be expressed as:

$$E_h = \sum_{x=1}^{m} \sum_{y=1}^{n} (h(x, y) - h*(x, y))^2 \quad \text{Eqn. (14)}$$

The desired heights h*(x,y) are predetermined values. That is, in advance of using computer system 16 to effect the methods described herein, the desired heights h*(x,y) are selected by a user or other person or built into the software as constant values. The selection of the desired heights h*(x,y) depends on the objective of the method. For example, different desired heights h*(x,y) can be selected for the method described herein with regard to FIG. 6 than for the method described herein with regard to FIG. 7. In view of the descriptions herein, persons skilled in the art will readily be capable of selecting the desired heights h*(x,y). For example, for relatively small heights, the desired heights h*(x,y) can be set to h(x,y) which allows the heights to vary over the iterations of the iterative method described below. For larger heights, the values can be reduced after each iteration. For example, a compression function can be used:

$$h*(x,y) = \alpha_h \log(1 + \alpha_h h(x,y)) \quad \text{Eqn. (14)}$$

As indicated by block 103 in FIG. 6, albedo can also be optimized. The image radiance term $E_r$ contributes to minimizing the squared difference of image radiance and corresponding image intensity for each light direction 1. Hence, the radiance term $E_r$ can be expressed as $$E_r^b = \sum_{x=1}^{m-1} \sum_{y=1}^{n} E_r^b(x, y).$$

The squared differences between radiance and the corresponding input image intensity can thus be expressed as:

$$E_r^b(x,y) = w_r^b(x,y)(L_x^b(x,y) - I_x^b(x,y))^2$$

The above-referenced iterative method for minimizing the total energy E or error term in equation (7) above can be performed as follows. On each iteration, a linearized gradient is set to zero by solving a linear system for the heights of the vertices. The linear system includes terms representing the above-referenced set of desired heights h*(x,y) and albedo ρ*(x,y). Note that equations (8, 12, 13, 14) are rearranged into the form Ax=b, where A is a matrix of coefficients, b is a vector of coefficients, x is a set of unknowns h(x,y), $h_c(x,y)$, and ρ(x,y). This linear system can be solved using any of a number of methods well known to persons skilled in the art. The set of desired heights h*(x,y) and surface albedo ρ*(x,y) is then updated with the results of the solution of the linear system. More specifically, the set of desired heights {h*(x,y)} and the set of values {$n_i$} are expressed as constants in the linear system and are updated on each iteration. The foregoing steps are repeated until the energy E decreases below a predetermined or fixed threshold energy value $E_{thresh}$ or the difference in the value of the energy E at two consecutive iterations ($E_n - E_{n-1}$) is smaller than a predetermined or fixed value $E_{diff}$.

As indicated by block 105 in FIG. 6, the optimizations can further include optimizing glossy surface reflectance. Allowing for non-lambertian bidirectional reflectance distribution functions (BRDFs) directly during the optimization is possible. Also, as an alternative, when not directly incorporating this during the optimization, this can be compensated for by including a final stage where a glossy term is computed. This can be done for example by assuming the Blinn-Phong shading model:

$$I_x^b(x,y) = \alpha(n \cdot h)^\gamma + \rho(x,y) \cdot (n \cdot 1),$$

where h is the half-way vector between the light and the viewing direction. The diffuse component, i.e. albedos and normals, are provided by the above described optimization. The glossiness coefficient α and the exponent γ is solved for separately at every pixel using grid search.

Once the height field has been computed (block 96) and any adjustments made to it (blocks 98, 100, 102, 103 and 105), the resulting height field data can be used to fabricate relief 12, as indicated by block 104. For example, computer system 16, operating in accordance with output controller element 48 (FIG. 1) can transfer the height field data in the form of an output file 52 (FIG. 1) to fabrication system 18 (FIG. 1), such as a computer-controlled milling or engraving machine or a rapid prototyping ("3D printer") machine. A milling machine, for example, can remove material from a solid block of material (not shown) in accordance with the height field, leaving an array of relief elements in the block of material, where each corresponds in shape, position in the height field, and height above a surface floor, to one of the pyramidal surface element 77 in the height field. Any suitable material can be used, such as a block of plastic or ceramic. If the material does not have a surface texture that is sufficiently diffuse, it can be coated with paint or other material that provides a diffuse surface texture. Alternatively, a machine can create a mold corresponding (negatively) to the height field, and a relief can then be molded using the mold. Surface albedo and glossy highlights can be applied (e.g., painted on) using a fabrication system 18 that includes, for example, a flatbed printer. Various other fabrication methods will occur to persons skilled in the art in view of the teachings herein.

The resulting relief 12 can be used in this exemplary embodiment by placing the above-described two light sources 56' and 60' (FIG. 4) that respectively illuminate relief 12 generally from directions 58' and 62'. Note that directions 58' and 62' correspond to the illumination directions 58 and 62 of the original subject 54 (FIG. 2) and that these are the directions in which such light sources were modeled in the equations above. The image that relief 12 conveys to the observer is shown for purposes of clarity in FIG. 4 in line drawing form and without shading. However, in practice an observer would perceive the image in different ways, depending upon the direction from which the light falls on relief 12. For example, relief 12, as illuminated by one such light source 56', conveys to an observer (not shown), who is located substantially at the position in which such an observer was modeled in the equations above, an image that corresponds to the above-referenced 2D input image 14 that was captured or otherwise provided with subject 54 illuminated from the direction 58. Likewise, the same relief 12, as illuminated by the other such light source 60', conveys to an observer (not shown), who is located substantially at the position in which such an observer was modeled in the equations above, an image that corresponds to the above-referenced 2D input image 14 that was captured or otherwise provided with subject 54 illuminated from the other direction 62.

Although not shown in the drawing figures for purposes of clarity, a perhaps more dramatic example of the method can involve two 2D digital images that are substantially different from each other. For example, as described above, a first 2D digital image 14 can be of a person's face while the person is smiling and illuminated from a first direction, and a second 2D digital image 14 can be of the same person's face while the person is frowning and illuminated from a second direction. A relief 12 produced by the above-described method, when illuminated from the first direction, would convey to an observer located substantially at the position in which such an observer was modeled in the equations above an image of the smiling face, and when illuminated from the second direction, would convey to an observer located substantially at the position in which such an observer was modeled in the equations above an image of the frowning face.

Figure 7:
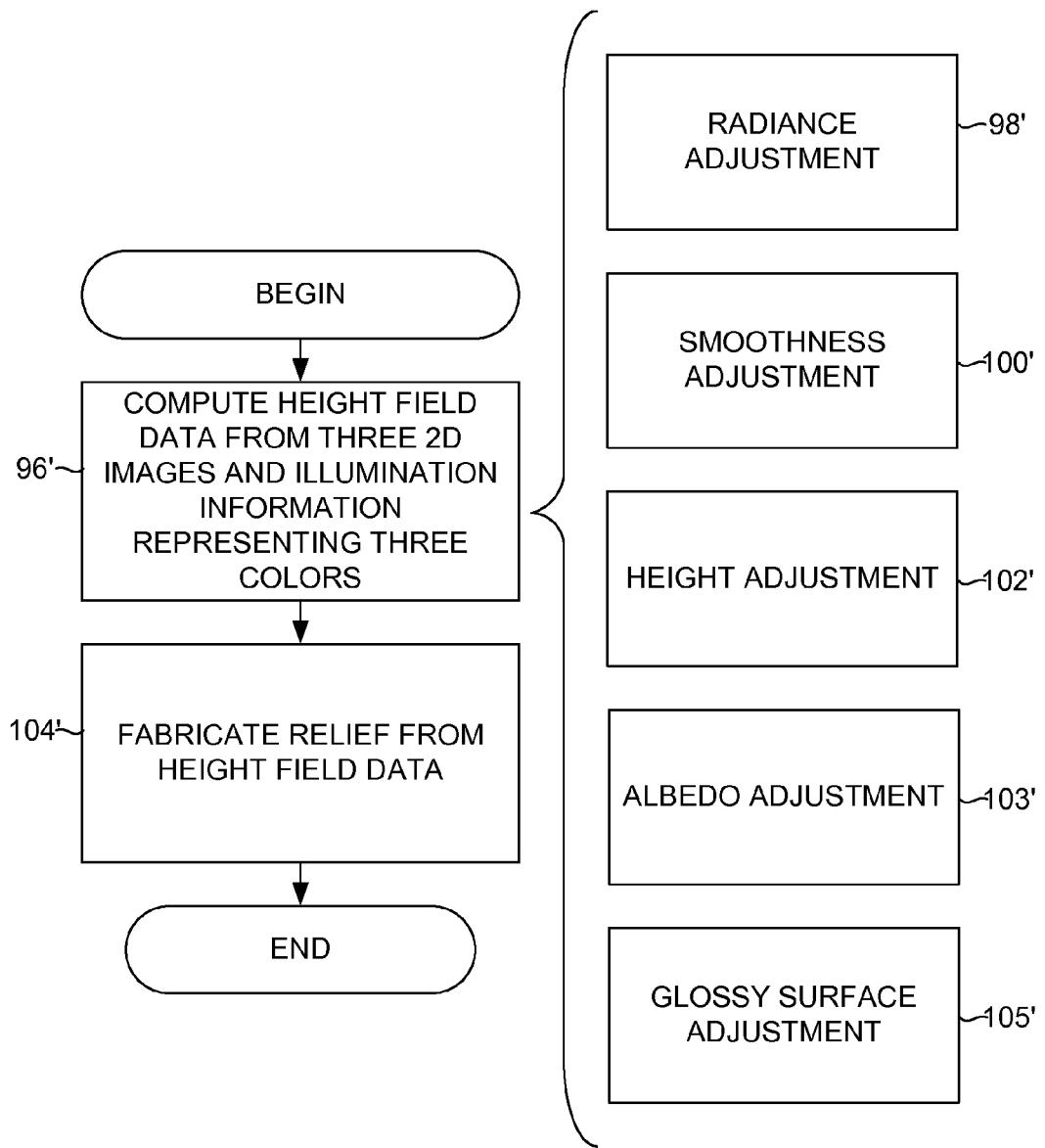
FIG. 7 is a flow diagram illustrating a method for producing a relief using the system of FIG. 1, in accordance with another exemplary embodiment of the invention.

As illustrated in FIG. 7, in another embodiment, as indicated by block 96', the height field is computed in a manner similar to that described above with regard to FIG. 6 except that three 2D digital images are used as input. The three 2D digital images can be, for example, those described above with regard to FIG. 3. That is, a first one of the 2D images represents subject 54 illuminated by red light from the first direction 66; a second one of the 2D digital images represents the same subject 54 illuminated by green light from the second direction 70; and a third one of the 2D digital images represents the same subject 54 illuminated by blue light from the third direction 74. As indicated by blocks 98', 100', 102', 103' and 105', adjustments can be made in the same manner as described above with regard to blocks 98, 100, 102, 103 and 105 in FIG. 6.

Figure 9:
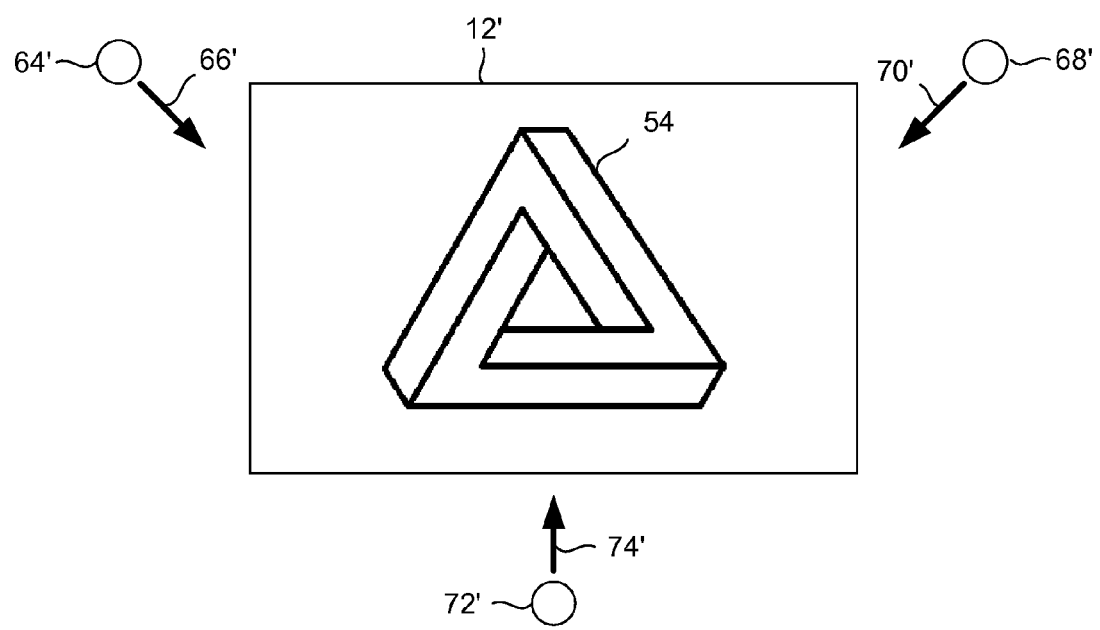
FIG. 9 is a top plan view of an exemplary relief produced by the method of FIG. 7.

As indicated by block 104', the computed height field data can then be used to fabricate a relief 12' (FIG. 9). Computer-controlled fabrication system 18 (FIG. 1) can be used in the same manner described above to produce relief 12' from a material.

The resulting relief 12' can be used in this exemplary embodiment by placing three light sources 64', 68' and 72' that respectively illuminate relief 12' generally from the directions 66', 70' and 72'. Note that directions 66', 70' and 72' correspond to the illumination directions 66, 70 and 72 of subject 54 (FIG. 3) and that these are the directions in which such light sources 64, 68 and 72 were modeled in the equations above in accordance with this embodiment. The image that relief 12' conveys to the observer is shown for purposes of clarity in FIG. 8 in monochromatic line-drawing form and without shading. However, in actuality an observer of relief 12' would perceive an image in full color. That is, relief 12', as illuminated by a red light source 64' from a first direction 66', a green light source 68' from a second direction 70', and a blue light source 72' from a third direction 74', conveys to an observer (not shown) who is located substantially at a position in which such an observer was modeled in the equations above an image that corresponds to the above-referenced 2D input image 14 that was captured or otherwise provided with the subject illuminated by light sources 64, 68 and 74 (FIG. 3). Each pyramidal relief element in relief 12' reflects the red, green and blue light in proportions that convey to the observer a mixture of those colors that corresponds to the pixel color in the original 2D digital image.

Figure 8:
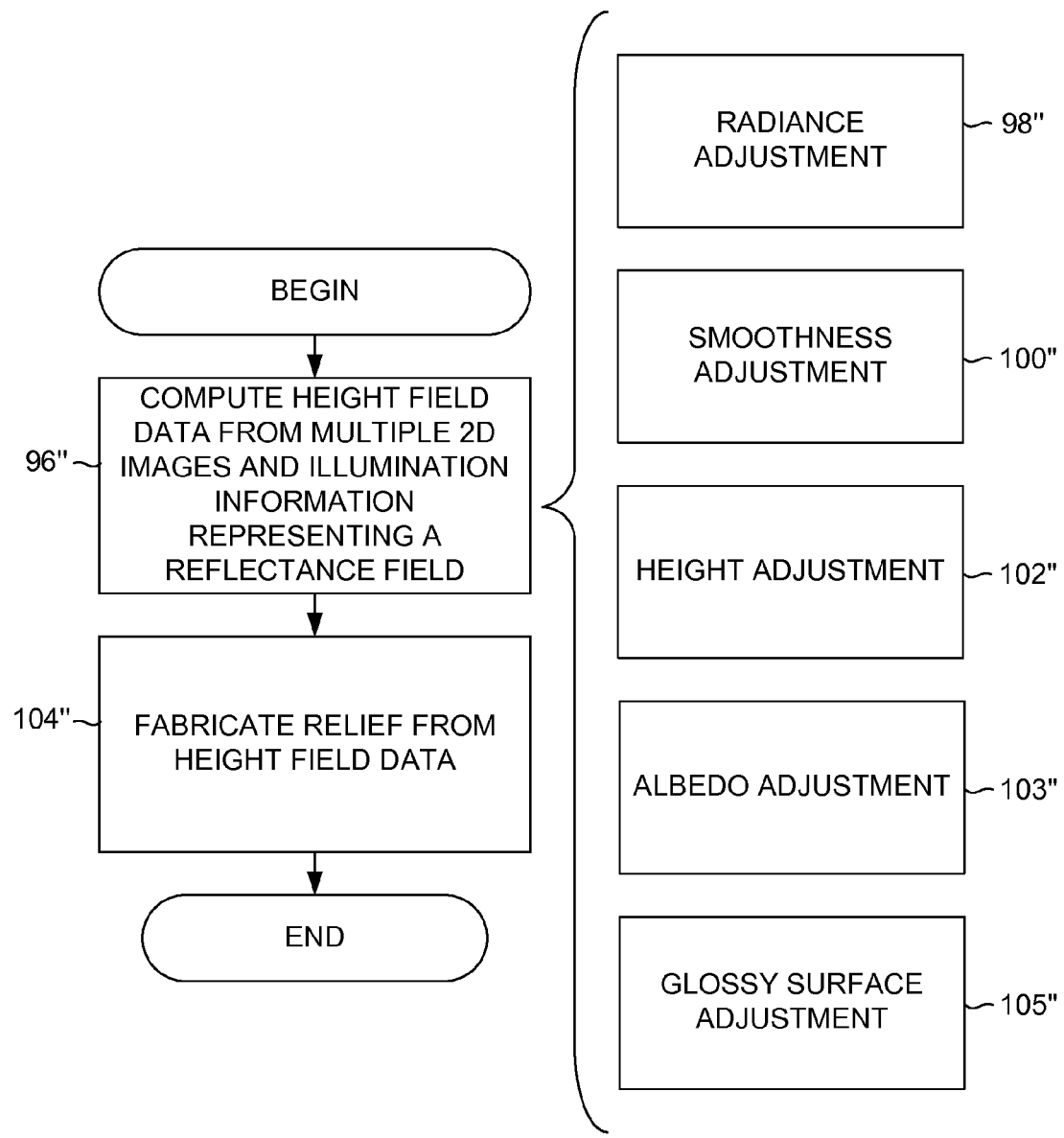
FIG. 8 is a flow diagram illustrating a method for producing a relief using the system of FIG. 1, in accordance with still another exemplary embodiment of the invention.

As illustrated in FIG. 8, in still another embodiment, as indicated by block 96", the height field is computed in a manner similar to that described above with regard to FIG. 6 and FIG. 7 except that multiple 2D digital images are used as input. The 2D digital images can be, for example, an arbitrary scene illuminated from different directions, i.e. a reflectance field represented as a set of photographs of a scene taken under different calibrated illumination directions. As indicated by blocks 98", 100", 102", 103" and 105", adjustments can be made in the same manner as described above with regard to blocks 98, 100, 102, 103 and 105 in FIG. 6 and FIG. 7.

As indicated by block 104", the computed height field data can then be used to fabricate a relief (not shown, but similar to relief 12' described above with regard to FIG. 9). Computer-controlled fabrication system 18 (FIG. 1) can be used in the same manner described above to produce such a relief from a material. The resulting relief can be used in the same manner described above with regard to the use of relief 12' (FIG. 9).

In the manner described above with regard to exemplary embodiments of the invention, a 3D relief can be produced that conveys to an observer two or more images or a single image in two or more ways, depending on the positions of the observer and the light sources illuminating the relief. In some instances, the exemplary method can use as input two or more 2D digital images that are substantially similar to each other. In such instances, the exemplary method can produce a relief that conveys images to an observer that the observer perceives as similar to one another. For example, such as relief can convey images of the same subject illuminated from different directions. In other instances, the exemplary method can use as input two or more 2D digital images that are substantially different from each other. In such instances, the exemplary method can produce a relief that conveys images to an observer that the observer perceives as different from one another. For example, such a relief can convey images of two different subjects. In a more specific example, such a relief can convey an image that the observer perceives as transitioning from one subject to another as the observer's position or the illumination changes with respect to the relief. In still another instance, a relief produced by the exemplary method can convey an image in full color when simultaneously illuminated by red, green and blue light from different directions.

While one or more embodiments of the invention have been described as illustrative of or examples of the invention, it will be apparent to those of ordinary skill in the art that other embodiments are possible that are within the scope of the invention. Accordingly, the scope of the invention is not to be limited by such embodiments but rather is determined by the appended claims.

What is claimed is:

1. A method for producing a three-dimensional relief in a physical material based on a two-dimensional digital (2D) image, the method being implemented in a computer system comprising one or more physical processors, non-transitory storage media storing machine-readable instructions, and a computer-controlled fabrication system, the method comprising:

mapping, using the one or more physical processors, individual pixels of a plurality of pixels included in a field of the 2D image to corresponding individual geometric surface elements of a plurality of geometric surface elements associated with a field of the three-dimensional relief;

determining, using the one or more physical processors, illumination direction information associated with the field of the 2D image, the illumination direction information conveying a direction of one or more light sources that are applied within a digital realm to the field of the 2D image;

determining, using the one or more physical processors, an albedo associated with the field of the 2D image based on the illumination direction information, the albedo describing a ratio between reflected and incident radiance in the direction of the one or more light sources;

determining, using the one or more physical processors, a glossiness value associated with the field of the 2D image based on the illumination direction information, the glossiness value conveying a quantity of radiance reflected at an angle from the direction of the one or more light sources;

determining, using the one or more physical processors, height parameters associated with individual geometric surface elements within the field of the three-dimensional relief, the height parameters being determined based on all three of the illumination direction information, the albedo, and the glossiness value; and fabricating, using the computer-controlled fabrication system, an array of relief elements in the physical material corresponding to the plurality of geometric surface elements, individual ones of the relief elements corresponding to individual ones of the geometric surface elements such that the array of relief elements embodies similar albedo and glossiness as determined for the 2D image under similar illumination conditions.

2. The method of claim 1, wherein a given geometric surface element has a pyramidal shape with four triangular facets, five vertices, a vertex defined by a position in the field and a height parameter, and wherein determining the height parameters includes determining at least one of the albedo or the glossiness value of the four triangular facets of the given geometric surface element.

3. The method of claim 2, wherein determining the height parameters comprises determining a height of the vertex above the surface floor from the illumination direction information and the 2D digital image.

4. The method of claim 3, wherein determining the height of the vertex comprises determining the height of the vertex using a set of linear equations representing aggregate radiance values of the triangular facets of the geometric surface elements in terms of vertex heights relative to at least one illumination direction.

5. The method of claim 1, wherein determining the height parameters comprises determining a minimized error term defined by a weighted combination of an image difference term, a surface smoothness term, a second-order smoothness term, and a height difference term.

6. The method of claim 1, wherein determining the height parameters comprises determining a minimized error term defined by a weighted combination of an image difference term, a surface smoothness term, a second-order smoothness term, a height difference term, an albedo term, and a glossiness term.

7. The method of claim 6, wherein determining the minimized error term comprises:

setting a linearized energy gradient to zero by solving a linear system for the heights of the vertices, the linear system including a set of heights; and updating the set of heights, albedos, and glossiness values;

wherein setting a linearized energy gradient to zero and updating the set of heights, albedo, and glossy reflection are iteratively performed until a minimized error decreases below a predetermined threshold value or a difference in error value at two consecutive iterations is smaller than a predetermined difference value.

8. The method of claim 1, wherein determining the height parameters comprises adjusting field radiance.

9. The method of claim 8, wherein adjusting field radiance comprises determining an image difference term expressed as a squared difference of radiance gradients and corresponding gradients of the at least one 2D digital image.

10. The method of claim 1, wherein determining the height parameters comprises adjusting field smoothness.

11. The method of claim 10, wherein adjusting field smoothness comprises determining a surface smoothness term expressed as second-order differences within individual pixels.

12. The method of claim 11, wherein adjusting field smoothness comprises determining a second order smoothness term of corner vertices.

13. The method of claim 1, wherein determining height parameters comprises adjusting field range.

14. The method of claim 13, wherein adjusting field range comprises determining a height difference term between resulting heights and a predetermined set of desired heights.

15. The method of claim 1, wherein determining the height parameters comprises determining the height parameters from two digital images and from illumination direction information representing two illumination directions, a first illumination direction corresponding to a first digital image and a second illumination direction corresponding to a second digital image.

16. The method of claim 15, wherein the first digital image of the two digital images represents the same subject as the second digital image but illuminated from a different direction.

17. The method of claim 1, wherein determining the height parameters comprises determining the height parameters from three digital images and from illumination direction information representing three illumination directions.

18. The method of claim 17, wherein the three digital images represent the same subject but are illuminated with a different one of red, green or blue light.

19. The method of claim 1, wherein determining the height parameters comprises determining the height parameters from multiple digital images and from illumination direction information representing a reflectance field.

20. A system for producing a three-dimensional relief in a physical material based on a two-dimensional digital (2D) image, the system comprising:

a computer-controlled fabrication system configured to produce the relief from a material and relief data; and a programmed processing system comprising a processor subsystem and a memory subsystem, the programmed processing system executing instructions to:

map individual pixels of a plurality of pixels included in a field of the 2D image to corresponding individual geometric surface elements of a plurality of geometric surface elements associated with a field of the three-dimensional relief;

determine illumination direction information associated with the field of the 2D image the illumination information conveying a direction of one or more light sources that are applied within a digital realm to the field of the 2D image;

determine an albedo associated with the field of the 2D image based on the illumination direction information, the albedo describing a ratio between reflected and incident radiance in the direction of the one or more light sources;

determine a glossiness value associated with the field of the 2D image based on the illumination direction information, the glossiness value conveying a quantity of radiance reflected at an angle from the direction of the one or more light sources;

determining height parameters associated with individual geometric surface elements within the field of the three-dimensional relief, the height parameters being determined based on all three of the illumination direction information, the albedo, and the glossiness value; and fabricate an array of relief elements in the physical material corresponding to the plurality of geometric surface elements;

the computer-controlled fabrication system fabricates an array of relief elements in the material, individual ones of the relief elements corresponding to individual ones of the geometric surface elements such that the array of relief elements embodies similar albedo and glossiness as determined for the 2D image under similar illumination conditions.

21. The system of claim 20, wherein the geometric surface element has a pyramidal shape with four triangular facets, five vertices, a vertex defined by a position in the field and a height parameter, and wherein determining the height parameters includes determining at least one of the albedo or the glossiness value of the four triangular facets of the given geometric surface element.

22. The system of claim 21, wherein the programmed processing system determines the height parameters by determining a height of the vertex above the surface floor from the illumination direction information and the at least one 2D digital image.

23. The system of claim 22, wherein the programmed processing system determines the height parameters of the vertex using a set of linear equations representing aggregate radiance values of the triangular facets of the geometric surface elements in terms of vertex heights relative to at least one illumination direction.

24. The system of claim 20, wherein the programmed processing system determines the height parameters by determining a minimized error term defined by a weighted combination of an image difference term, a surface smoothness term, a second-order smoothness term, and a height difference term.

25. The system of claim 20, wherein the programmed processing system determines a height parameters by computing a minimized error term defined by a weighted combination of an image difference term, a surface smoothness term, a second-order smoothness term, a height difference term, an albedo term, and a glossiness term.

26. The system of claim 25, wherein the programmed processing system determines the minimized error term by:
setting a linearized energy gradient to zero by solving a linear system for the heights of the vertices, the linear system including a set of heights, albedo values, and glossiness values; and
updating the set of heights, albedo values, and glossiness values;
wherein setting a linearized energy gradient to zero and updating the set of heights, albedo values, and glossiness values are iteratively performed until a minimized error decreases below a predetermined threshold value or a difference in error value at two consecutive iterations is smaller than a predetermined difference value.

27. The system of claim 20, wherein the programmed processing adjusts height parameter radiance in determining the height parameters.

28. The system of claim 27, wherein the programmed processing system adjusts field radiance by determining an image difference term expressed as a squared difference of radiance gradients and corresponding gradients of the at least one 2D digital image.

29. The system of claim 20, wherein programmed processing system adjusts field smoothness in determining the height parameters.

30. The system of claim 29, wherein the programmed processing system adjusts field smoothness by determining a surface smoothness term expressed as second-order differences within individual pixels.

31. The system of claim 30, wherein the programmed processing system adjusts field smoothness by determining a second order smoothness term of corner vertices.

32. The system of claim 20, wherein the programmed processing system adjusts field range in determining the height parameters.

33. The system of claim 32, wherein the programmed processing system adjusts field range by determining a height difference term between resulting heights and a predetermined set of desired heights.

34. The system of claim 20, wherein the programmed processing system determines the height parameters from two digital images and from illumination direction information representing two illumination directions, a first illumination direction corresponding to a first digital image.

35. The system of claim 34, wherein the first digital image of the two digital images represents the same subject the second digital image but illuminated from a different direction.

36. The system of claim 20, wherein the programmed processing system determines the height parameters from three digital images and from illumination direction information representing three illumination directions.

37. The system of claim 36, wherein the three digital images represents the same subject but are illuminated with a different one of red, green and blue light.

38. The system of claim 20, wherein the programmed processing system determines the height field from multiple digital images and from illumination direction information representing a reflectance field, the illumination direction corresponding to one of the digital images.

39. A non-transitory computer program product for producing a three-dimensional relief in a physical material based on a two-dimensional digital (2D) image, the computer program product comprising a computer-readable medium on which is stored in executable form instructions that, when executed on a computer system, cause the computer system to:
map individual pixels of a plurality of pixels included in a field of the 2D image to corresponding individual geometric surface elements of a plurality of geometric surface elements associated with a field of the three-dimensional relief;
determine illumination direction information associated with the field of the 2D image the illumination information conveying a direction of one or more light sources that are applied within a digital realm to the field of the 2D image;
determine an albedo associated with the field of the 2D image based on the illumination direction information, the albedo describing a ratio between reflected and incident radiance in the direction of the one or more light sources;

determine a glossiness value associated with the field of the 2D image based on the illumination direction information, the glossiness value conveying a quantity of radiance reflected at an angle from the direction of the one or more light sources;

determine height parameters associated with individual geometric surface elements within the field and the three-dimensional relief, the height parameters being determined based on all three of the illumination direction information, the albedo, and the glossiness values; and control a computer-controlled fabrication system to fabricate an array of relief elements in the physical material corresponding to the plurality of geometric surface elements, individual ones of the relief elements corresponding to individual ones of the geometric surface elements such that the array of relief elements embodies similar albedo and glossiness as determined for the 2D image under similar illumination conditions.

40. The computer program product of claim 39, wherein a given geometric surface element has a pyramidal shape with four triangular facets, five vertices, a vertex defined by a position in the field and the height parameter.

41. The computer program product of claim 40, wherein the instructions cause the computer system to determine the height field by determining a height of the vertex above the surface floor from the illumination direction information and the at least one 2D digital image.

42. The computer program product of claim 41, wherein the instructions cause the computer system to determine the height of the vertex using a set of linear equations representing aggregate radiance values of the triangular facets of the geometric surface elements in terms of vertex heights relative to at least one illumination direction.

43. The computer program product of claim 39, wherein the instructions cause the computer system to the height parameters by determining a minimized error term defined by a weighted combination of an image difference term, a surface smoothness term, a second-order smoothness term, and a height difference term.

44. The computer program product of claim 43, wherein the instructions cause the computer system to determine the minimized error term by:
setting a linearized energy gradient to zero by solving a linear system for the heights of the vertices, the linear system including a set of heights, albedo values, and glossiness values; and
updating the set of heights, albedo values and glossiness values;
wherein setting a linearized energy gradient to zero and updating the set of heights, albedo values and glossiness values are iteratively performed until a minimized error decreases below a predetermined threshold value or a difference in error value at two consecutive iterations is smaller than a predetermined difference value.

45. The computer program product of claim 44, wherein the instructions cause the computer system to adjust field radiance in determining the height parameters.

46. The computer program product of claim 45, wherein the instructions cause the computer system to adjust field radiance by determining an image difference term expressed as a squared difference of radiance gradients and corresponding gradients of the at least one 2D digital image.

47. The computer program product of claim 39, wherein the instructions cause the computer system to adjust field smoothness in determining the height parameters.

48. The computer program product of claim 47, wherein the instructions cause the computer system to adjust field smoothness by determining a surface smoothness term expressed as second-order differences within individual pixels.

49. The computer program product of claim 48, wherein the instructions cause the computer system to adjust field smoothness by determining a second order smoothness term of corner vertices.

50. The computer program product of claim 39, wherein the instructions cause the computer system to adjust field range in determining the height parameters.

51. The computer program product of claim 50, wherein the instructions cause the computer system to adjust field range by determining a height difference term between resulting heights and a predetermined set of desired heights.

52. The computer program product of claim 39, wherein the instructions cause the computer system to determine the height parameters from two digital images and from illumination direction information representing two illumination directions, a first illumination direction corresponding to a first digital image and a second illumination direction corresponding to a second digital image.

53. The computer program product of claim 52, wherein the first digital image of the two digital images represents the same subject as the second digital image but illuminated from a different direction.

54. The computer program product of claim 39, wherein the instructions cause the computer system to determine the height field from three digital images and from illumination direction information representing three illumination directions.

55. The computer program product of claim 54, wherein the three digital images represents the same subject but are illuminated with a different one of red, green and blue light.

56. The computer program product of claim 39, wherein the instructions cause the computer system to determine the height field from multiple digital images and from illumination direction information representing a reflectance field.

* * * * *